(12) United States Patent
Liu

(10) Patent No.: US 11,019,598 B1
(45) Date of Patent: May 25, 2021

(54) PAGING INDICATION METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/786,982

(22) Filed: Feb. 10, 2020

(51) Int. Cl.
*H04W 68/02* (2009.01)
*H04W 72/04* (2009.01)

(52) U.S. Cl.
CPC ......... *H04W 68/02* (2013.01); *H04W 72/042* (2013.01)

(58) Field of Classification Search
CPC ............................ H04W 68/02; H04W 72/042
USPC ......................................................... 455/458
See application file for complete search history.

(56) References Cited

U.S. PATENT DOCUMENTS

2016/0338006 A1   11/2016   Lee et al.

FOREIGN PATENT DOCUMENTS

| CN | 101155167 A | 4/2008 |
|---|---|---|
| CN | 101491150 A | 7/2009 |
| CN | 101557586 A | 10/2009 |
| CN | 102090122 A | 6/2011 |
| CN | 102857869 A | 1/2013 |
| CN | 102083110 A | 8/2013 |
| CN | 107018496 A | 8/2017 |
| CN | 107018497 A | 8/2017 |

OTHER PUBLICATIONS

CN 1st Office Action in Application No. 201780001372.8, dated Feb. 20, 2021.

*Primary Examiner* — Joel Ajayi
(74) *Attorney, Agent, or Firm* — Syncoda LLC; Feng Ma

(57) ABSTRACT

A method for a base station includes: configuring at least one first paging occasion for representing a paging indication; configuring a second paging occasion for representing a paging message; and transmitting the first paging occasion and the second paging occasion to a terminal user equipment (UE), so that the UE determines a corresponding paging indication according to the first paging occasion and determines a corresponding paging message according to the second paging occasion.

8 Claims, 12 Drawing Sheets

---

Determining that the corresponding paging indication indicates that the system message is updated and reading the updated system information in response to detecting that all bits in the bitmap are 1 — 710

Determining that the corresponding paging indication indicates that there is no paging message and continuing sleeping in response to detecting that not all of the bits in the bitmap are 1 and the bit indicating a group to which the UE belongs is 0 — 720

Determining that the corresponding paging indication indicates there is a paging message in response to detecting that not all of the bits in the bitmap are 1 and the bit indicating a group to which the UE belongs is 1 — 730

PAGING INDICATION METHOD AND DEVICE

CROSS-REFERENCE TO RELATED APPLICATION

This is a continuation of International application No. PCT/CN2017/097158 filed on Aug. 11, 2017, the disclosure of which is hereby incorporated by reference in its entirety.

BACKGROUND

In a Long-Term Evolution (LTE) system, a paging message is mapped to a Physical Downlink Shared Channel (PDSCH), and a Physical Downlink Control Channel (PDCCH) corresponding to the PDSCH is monitored by User Equipment (UE). When the UE monitors that there is a paging scheduling for itself on the PDCCH, the UE receives the PDSCH according to information on the PDCCH, thereby obtaining the paging message.

SUMMARY

The present disclosure relates generally to the field of communications, and more specifically to a method and a device for paging indication.

Various embodiments of the present disclosure provide a method and a device for paging indication.

According to a first aspect of embodiments of the present disclosure, a method for paging indication is provided for a base station, the method including:

configuring at least one first paging occasion, the first paging occasion representing a paging indication;

configuring a second paging occasion, the second paging occasion representing a paging message; and transmitting the first paging occasion and the second paging occasion to a terminal UE so that the UE determines a corresponding paging indication according to the first paging occasion and determines a corresponding paging message according to the second paging occasion.

According to a second aspect of embodiments of the present disclosure, a method for paging indication is provided for a terminal UE, the method including:

receiving at least one first paging occasion and a second paging occasion transmitted by a base station, the first paging occasion representing a paging indication, and the second paging occasion representing a paging message; and determining a corresponding paging indication according to the first paging occasion and determining a corresponding paging message according to the second paging occasion.

According to a third aspect of embodiments of the present disclosure, there is provided a device for paging indication, applied to a terminal UE, the device including:

a processor; and a memory for storing instructions executable by the processor, wherein the processor is configured to:

receive at least one first paging occasion and a second paging occasion transmitted by a base station, wherein the first paging occasion is configured for representing a paging indication, and the second paging occasion is configured for representing a paging message; and determine a corresponding paging indication according to the first paging occasion and determine a corresponding paging message according to the second paging occasion.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used in the present disclosure only tend to depict specific embodiments, rather than restricting the present disclosure. Unless the exceptional case in which the context clearly gives supports, the singular forms "a," "an," and "the" used in the present disclosure and accompany claims are intended to include the plural forms. It should also be appreciated that the expression "and/or" used herein indicates including any and all possible combinations of one or more of the associated listed items.

It should be understood, although terms first, second, third and the like are used in the present disclosure to depict various information, such information is not restricted by these terms. These terms are only used to distinguish information of the same type from each other. For example, without departing from the scope of the present disclosure, the first information may also be referred to as the second information. Similarly, the second information may also be referred to as the first information. Depending on context, the word "if" used herein may be explained to "when" or "upon" or "in response to determining . . . ."

Existing 5th-Generation (5G) systems will target at high frequency band applications, and it may be necessary to introduce beam sweeping and beam management in communication. Therefore, the existing technical solutions are not adaptable for the 5G high frequency systems with the beam sweeping.

Figure 1:
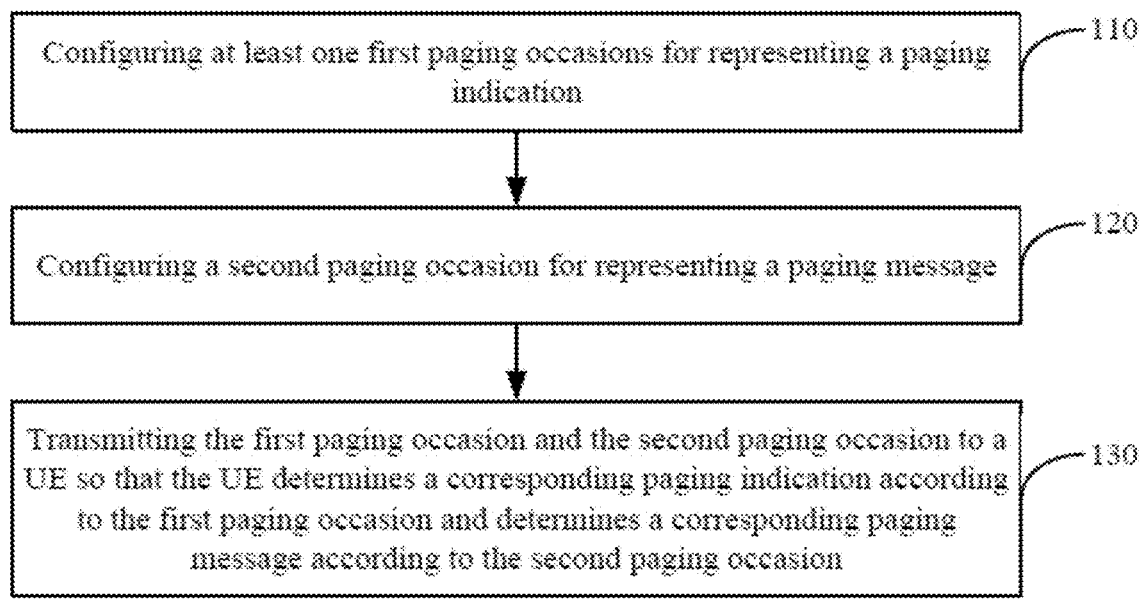
FIG. 1 is a flowchart showing a method for paging indication according to some embodiments.
Figure 2:
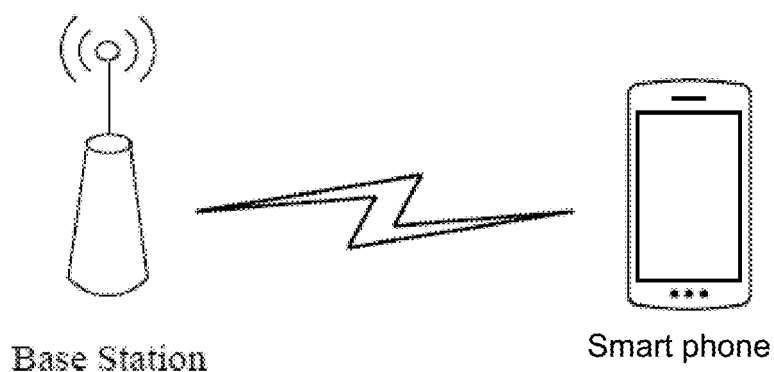
FIG. 2 is a schematic diagram illustrating a scenario for a method for paging indication according to some embodiments.

FIG. 1 is a flowchart showing a method for paging indication according to some embodiments, and FIG. 2 is a schematic diagram illustrating a scenario for a method for paging indication according to some embodiments. The method for paging indication can be implemented at a base station. As shown in FIG. 1, the method of paging indication includes the following steps 110-130.

In step 110, at least one first paging occasion is configured, the first paging occasion representing a paging indication.

In step 120, a second paging occasion is configured, the second paging occasion representing a paging message.

In some embodiments of the present disclosure, the base station will configure the first paging occasion and the second paging occasion within each of configuration cycles, i.e., 20 ms.

In step 130, the first paging occasion and the second paging occasion are transmitted to a UE so that the UE determines a corresponding paging indication according to the first paging occasion and determines a corresponding paging message according to the second paging occasion.

In some embodiments of the present disclosure, the base station can transmit the configured first and second paging occasions to the UE through a system message.

In an exemplary scenario, as shown in FIG. 2, a base station and a smartphone as a UE are included. The base station configures the first paging occasion for representing the paging indication and the second paging occasion for representing the paging message, and transmits the first and second paging occasions to the smart phone. The smart phone will determine the corresponding paging indication according to the received first paging occasion, and determine the corresponding paging message according to the received second paging occasion so that the smartphone can determine different contents at different paging occasions, thereby improving efficiency of paging indication.

It can be seen from the above embodiments that the first paging occasion for representing the paging indication and the second paging occasion for representing the paging message are configured and transmitted to UEs, so that the UEs can determine different contents at different paging occasions, thereby improving the efficiency of the paging indication.

In some embodiments, in the above step 110, the paging indication can be configured for indicating that a system message is updated, or for indicating that there is a paging message.

In some embodiments of the present disclosure, if the paging indication indicates that the system message is updated, the updating of the system message is for all UEs. If the paging indication indicates that there is a paging message, the paging message is for one or more groups of UEs. In addition, the paging indication may also be configured for indicating that there is no paging message. Or, the paging indication may not directly indicate that there is no paging message. Instead, the scenarios other than indicating that the system message is updated and there is a paging message as described above indicates that there is no paging message by default.

It can be seen from the above embodiments that the paging indication is only configured for indicating that there is a paging message, but does not include the paging message. In this way, it's unnecessary for the paging indication to be transmitted in PDSCH. Instead, the paging indication can be only activated in PDCCH, thereby bandwidth resources can be saved.

Figure 3A:
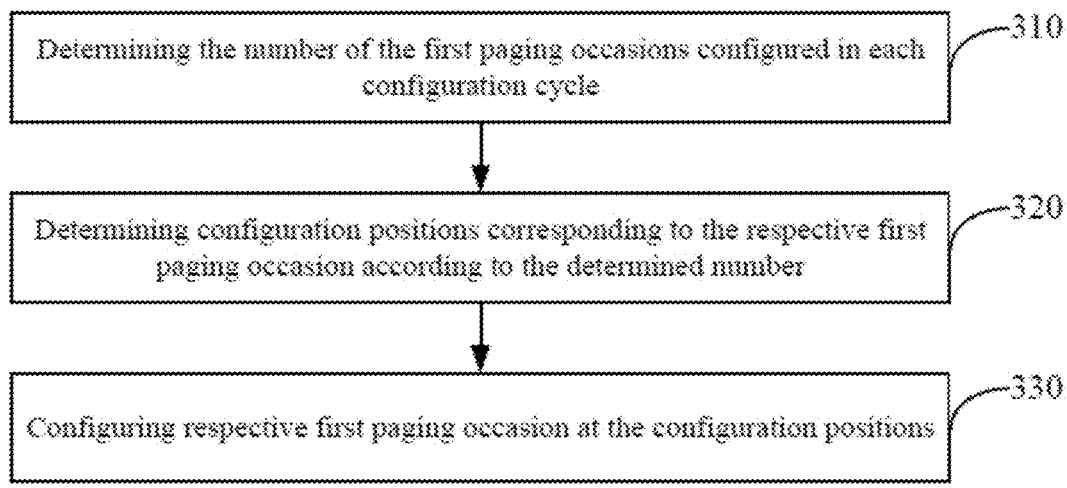
FIG. 3A is a flowchart showing another method for paging indication according to some embodiments.

In some embodiments, as shown in FIG. 3A, configuring the first paging occasion can include the following steps 310-330.

In step 310, the number of the first paging occasions configured in each configuration cycle is determined.

In some embodiments of the present disclosure, in a 5G system, each of the configuration cycles can be 20 ms. In this configuration cycle, at least one first paging occasion can be configured according to the actual situation.

In step 320, configuration positions corresponding to the respective first paging occasions are determined according to the determined number.

In step 330, respective first paging occasions are configured at the respective configuration positions.

It can be seen from the above embodiments that by determining the number of the first paging occasions configured in each configuration cycle, determining the configuration positions corresponding to the respective first paging occasions according to the determined number, and configuring respective first paging occasions at the respective configuration positions, the position configuration function of the first paging occasion is achieved, so that UEs can detect the paging indication corresponding to the first paging occasion as soon as possible, thereby improving the efficiency of the paging indication is improved.

In some embodiments, in the above step 310, the determined number is one, and the determining the configuration positions corresponding to the respective first paging occasions according to the determined number includes:

determining a first configuration position corresponding to one of the first paging occasion in an approach of Frequency Division Multiplexing (FDM), wherein the first configuration position is the same as a position of a Synchronous Signal Block (SSB) in a time domain.

Figure 3B:
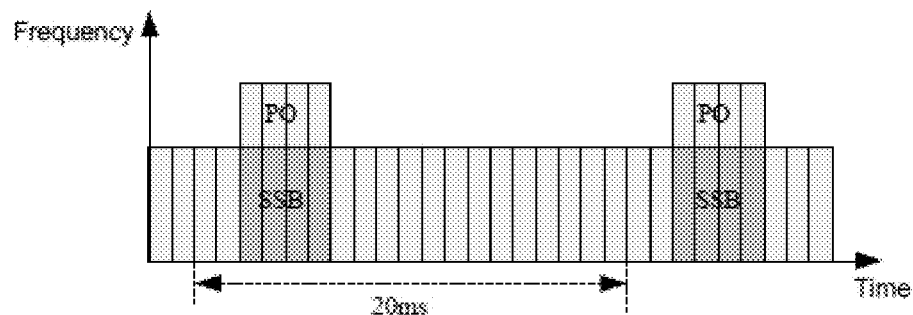
FIG. 3B is a schematic diagram illustrating configuration positions corresponding to first paging occasions according to some embodiments.

In some embodiments of the present disclosure, if only one first paging occasion is needed to be configured, the first paging occasion can be frequency division multiplexed with a SSB, that is, their positions are the same in the time domain and different in frequency domain (the approach of FDM). As shown in FIG. 3B, PO and SSB are the same in the time domain, where PO refers to the first paging occasion.

It can be seen from the above embodiments that when one first paging occasion is needed to be configured, the first configuration position corresponding to the first paging occasion can be determined according to the FDM approach, and the first configuration position is the same as a position of a SSB in the time domain, so that the first paging occasion is detected at the same time when SSB is received, thereby saving energy consumption of the UEs.

In some embodiments, in the above step 310, the determined number is more than one, and the determining the configuration positions corresponding to the respective first paging occasions according to the determined number includes:

determining second configuration positions corresponding to the respective first paging occasions in an approach of the combination of FDM and Time Division Multiplexing (TDM). One of the second configuration positions is the same as a position of a SSB in a time domain, and the others are adjacent to the SSB in the time domain.

Figure 3C:
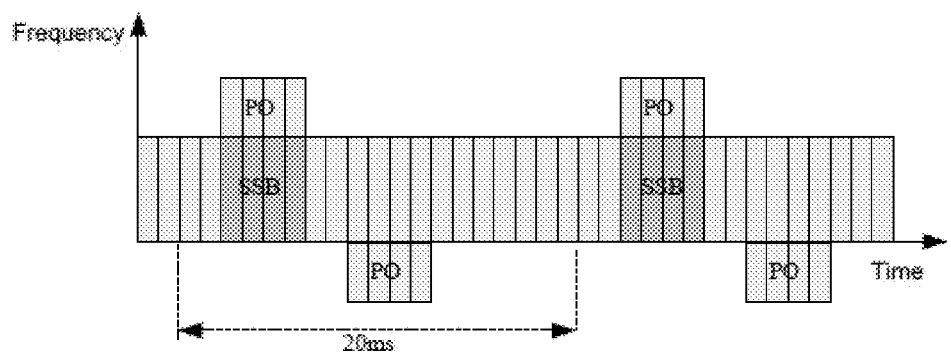
FIG. 3C is another schematic diagram illustrating configuration positions corresponding to first paging occasions according to some embodiments.

In some embodiments of the present disclosure, if more than one first paging occasions is needed to be configured, one of the first paging occasions can be configured at the same time as a position of a SSB (FDM approach), and the others can be configured near the SSB (TDM approach). As shown in FIG. 3C, some of the POs are the same as the SSB in time domain, and some of the POs are configured near the SSB, where PO refers to the first paging occasion. Alternatively, all of the first paging occasions can be configured near SSB.

It can be seen from the above embodiments that when more than one first paging occasions are needed to be configured, the approach of the combination of FDM and TDM can be used. One of the second configuration positions is the same as a position of SSB in the time domain, and the others of the second configuration positions are adjacent to SSB in the time domain. In this way, UEs can detect the respective first paging occasions as soon as possible while receiving SSB, thereby saving the energy consumption of UEs.

Figure 4:
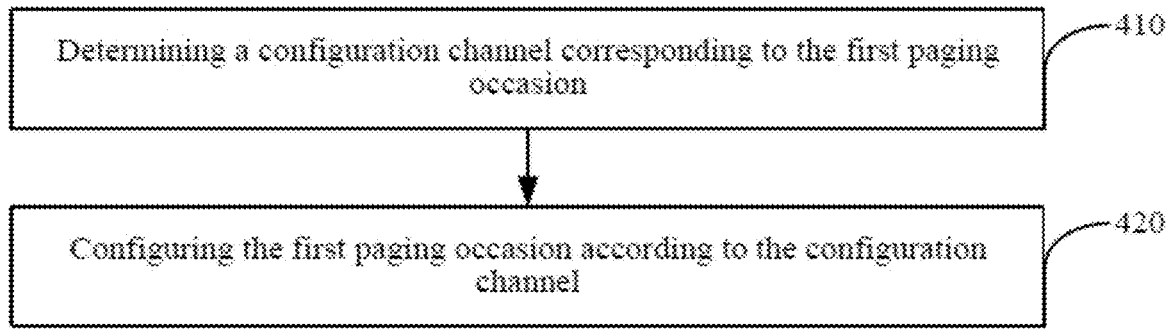
FIG. 4 is a flowchart showing another method for paging indication according to some embodiments.

In some embodiments, as shown in FIG. 4, configuring the first paging occasion may include the following steps 410-420.

In step 410, a configuration channel corresponding to the first paging occasion is determined.

In some embodiments of the present disclosure, the first paging occasion may be based on a scheduled channel or an unscheduled channel.

In step 420, the corresponding first paging occasions are configured according to the determined configuration channel.

It can be seen from the above embodiments that by determining the configuration channel corresponding to the first paging occasions and configuring the corresponding first paging occasions according to the determined configuration channel, the channel configuration function of the first paging occasion is achieved, so that UEs can detect the paging indication corresponding to the first paging occasion as soon as possible, thereby improving the efficiency of the paging indication.

In some embodiments, in the above step 410, the configuration channel is an un-scheduled channel, and the un-scheduled channel is in a form of bitmap.

In this way, it can include the following steps for performing step 420:

(1) setting all bits in the bitmap to 1 if the paging indication indicates that the system message is updated;

(2) setting the bits corresponding to the one or more groups of UEs in the bitmap to 1 if the paging indication indicates that there is a paging message for one or more groups of UEs; and (3) setting the bits corresponding to the one or more groups of UEs in the bitmap to 0 if the paging indication indicates that there is no paging message for the one or more groups of UEs.

In the present disclosure embodiment, if all the bits in the bitmap are 1, it indicates that the system message is updated. If not all of the bits in the bitmap are 1, for any one of the bits, the bit 0 indicates that there is no paging message for one or more groups of UEs, and the bit 1 indicates that there is a paging message for one or more groups of UEs.

For example, there are 100 bits in the bitmap, if all the 100 bits are 1, it indicates that the system message is updated, if not all of the 100 bits are 1, for any one of the 100 bits, the bit is configured for indicating whether there is paging message, the bit 0 indicates that there is no paging message for one or more groups of UEs, and the bit 1 indicates that there is a paging message for one or more groups of UEs.

It can be seen from the above embodiments that the unscheduled channel is configured as the configuration channel of the first paging occasion, and the bits in the bitmap are configured to represent the paging indication, so that UEs can quickly identify the paging indication, thereby improving the efficiency of the paging indication.

In some embodiments, in the above step 410, the configuration channel is a scheduled channel, and a DCI in the scheduled channel is configured for carrying the paging indication.

In this way, it can include the following steps for performing step 420:

(1) adding the paging indication indicating that the system message is updated to the DCI if the paging indication indicates that the system message is updated; and (2) adding the paging indication indicating that there is a paging message for one or more groups of UEs to the DCI if the paging indication indicates that there is a paging message for one or more groups of UEs.

It can be seen from the above embodiments that the scheduled channel is configured as the configuration channel of the first paging occasion, and the DCI in the scheduled channel carries the paging indication, so that the UE can read the paging indication directly from the DCI, thereby improving the efficiency of the paging indication.

In some embodiments, in the above step 120, configuring the second paging occasion may include:

configuring one second paging occasion in each configuration cycle.

In some embodiments of the present disclosure, in a 5G system, each configuration cycle can be 20 ms.

In addition, since beam sweeping is used in the 5G system, and only a part of UEs which know that there may be paging messages will detect the second paging occasion, only one second paging occasion could be configured within 20 ms, there is no limit on time, and the frequency is still within a minimum bandwidth.

It can be seen from the above embodiments that one second paging occasion is configured in each configuration cycle, which not only ensures that UEs can detect the second paging occasion, but also saves bandwidth resources.

Figure 5:
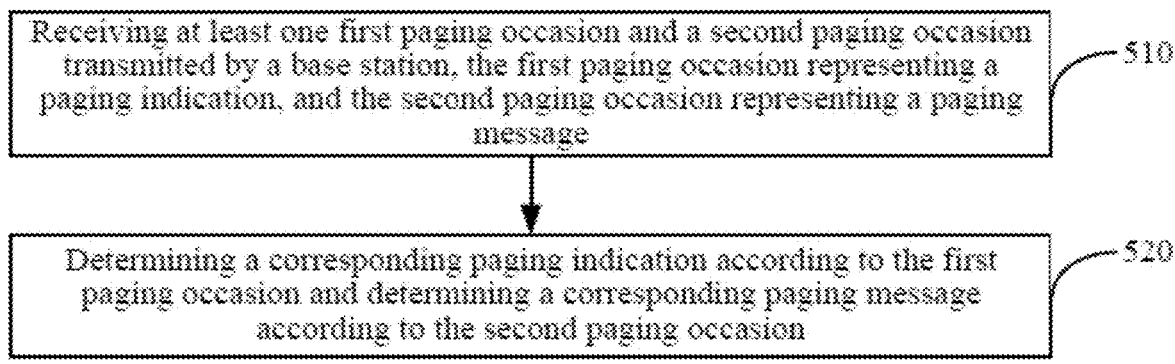
FIG. 5 is a flowchart showing a method for paging indication according to some embodiments.

FIG. 5 is a flowchart showing a method for paging indication according to some embodiments. The method for paging indication can be applied to a UE, which can be any smart terminal supporting Wi-Fi function, such as a mobile phone, a tablet, a PDA (personal digital assistant), etc. As shown in FIG. 5, the method for paging indication can include the following steps 510-520.

In step 510, at least one first paging occasion and a second paging occasion transmitted by a base station are received, the first paging occasion representing a paging indication, and the second paging occasion representing a paging message.

In some embodiments of the present disclosure, UE may receive the first paging occasion and the second paging occasion at the same time, or may receive the first paging occasion and the second paging occasion respectively at different times.

In step 520, a corresponding paging indication is determined according to the first paging occasion and a corresponding paging message is determined according to the second paging occasion.

It can be seen from the above embodiments that by receiving the first paging occasion and the second paging occasion, determining the corresponding paging indication according to the first paging occasion, and determining the corresponding paging message according to the second paging occasion, UEs can determine different contents at different paging occasions, thereby improving the efficiency of paging indication.

Figure 6:
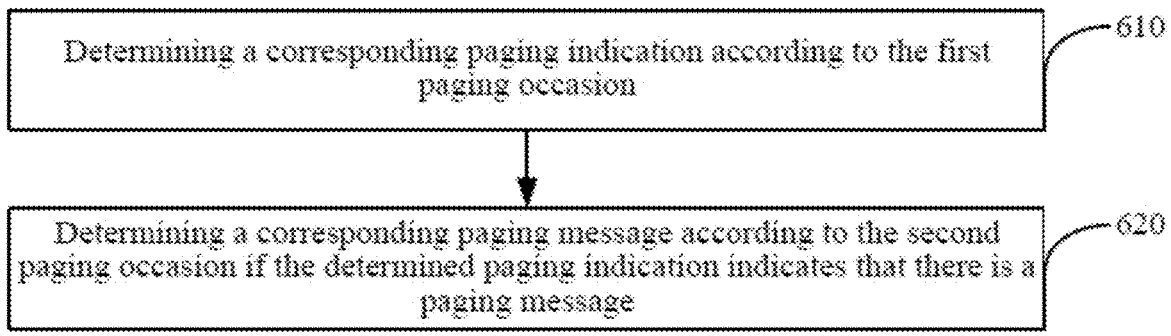
FIG. 6 is a flowchart showing another method for paging indication according to some embodiments.

In some embodiments, as shown in FIG. 6, it may include the following steps for performing step 520:

In step 610, the corresponding paging indication is determined according to the first paging occasion.

In step 620, a corresponding paging message is determined according to the second paging occasion if the determined paging indication indicates that there is a paging message.

It can be seen from the above embodiment that by determining the corresponding paging indication according to the first paging occasion, the corresponding paging message is determined according to the second paging occasion only when the determined paging indication indicates that there is a paging message, thereby saving the energy consumption of the terminals and improving the efficiency of the paging indication.

In some embodiments, in the above step 610, a configuration channel corresponding to the first paging occasion is an unscheduled channel, and the unscheduled channel is in a form of a bitmap.

If all bits in the bitmap are 1, it indicates that the system message is updated;

If not all of the bits in the bitmap are 1, for any one of the bits, the bit 0 indicates that there is no paging message for one or more groups of UEs, and the bit 1 indicates that there is a paging message for one or more groups of UEs.

Figure 7:
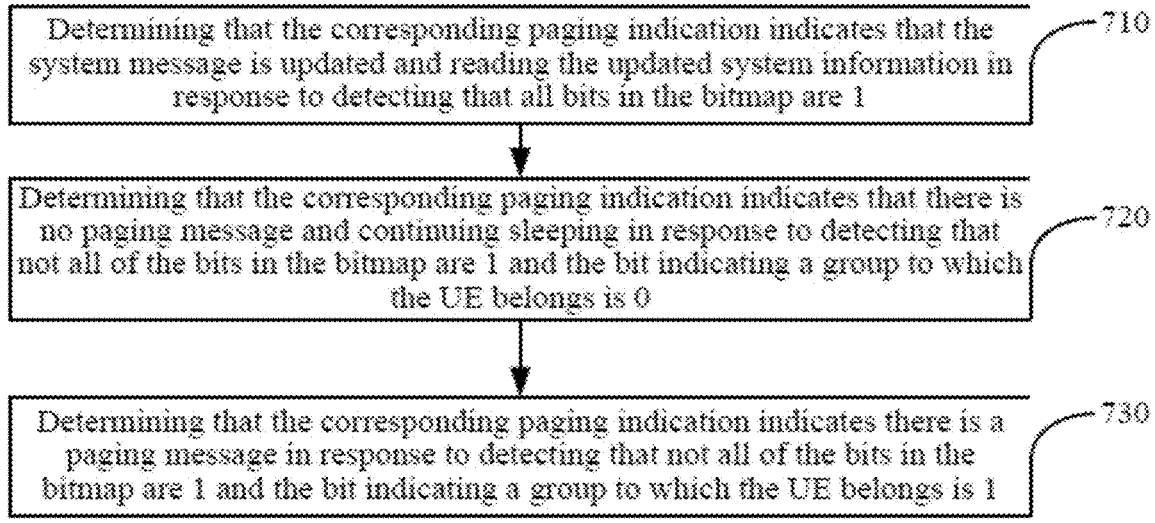
FIG. 7 is a flowchart showing another method for paging indication according to some embodiments.

As shown in FIG. 7, it may include the following steps 710-730 for performing step 610.

In step 710, it is determined that the corresponding paging indication indicates that the system message is updated and the updated system information is read if it is detected that all bits in the bitmap are 1.

In step 720, it is determined that the corresponding paging indication indicates that there is no paging message and it continues sleeping in response to detecting that not all of the bits in the bitmap are 1 and the bit indicating for a group to which the UE belongs is 0.

In step 730, it is determined that the corresponding paging indication indicates that there is a paging message in response to detecting that not all of the bits in the bitmap are 1 and the bit indicating for a group to which the UE belongs is 1.

It can be seen from the above embodiment that the paging indication is identified by the bits in the bitmap of the unscheduled channel, so that the paging indication can be quickly identified, thereby improving the efficiency of the paging indication.

In some embodiments, in the above step 610, the configuration channel corresponding to the first paging occasion is a scheduled channel, and a Downlink Control Information (DCI) in the scheduled channel is configured for carrying the paging indication.

Figure 8:
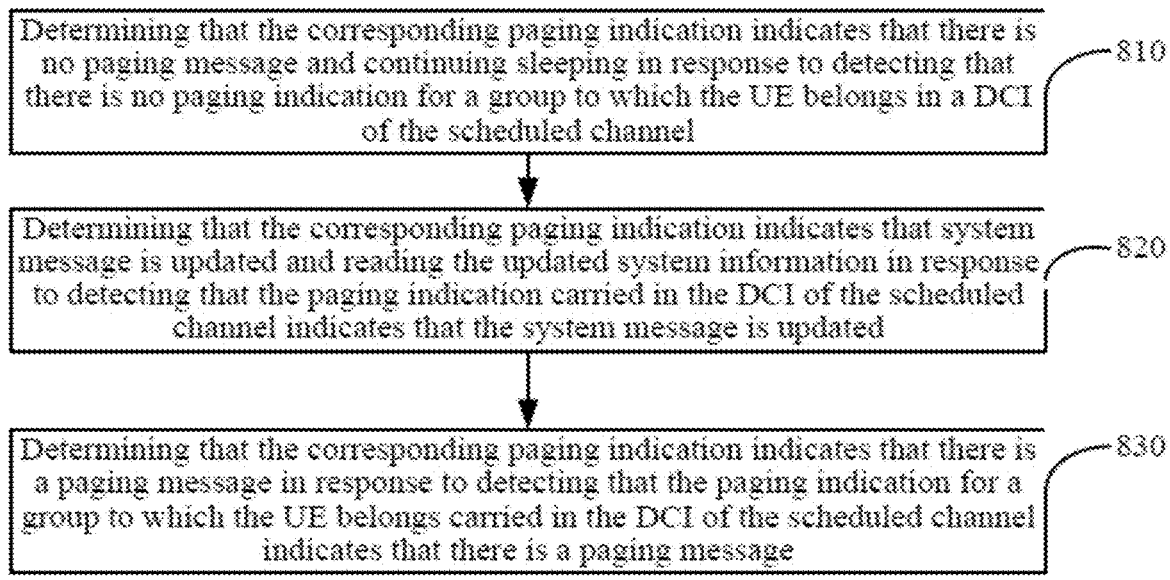
FIG. 8 is a flowchart showing another method for paging indication according to some embodiments.

As shown in FIG. 8, it can include the following steps 810-830 for performing step 610.

In step 810, it is determined that the corresponding paging indication indicates that there is no paging message and it continues sleeping in response to detecting that there is no paging indication for a group to which the UE belongs in a DCI of the scheduled channel.

In step 820, it is determined that the corresponding paging indication indicates that system message is updated and the updated system information is read in response to detecting that the paging indication carried in the DCI of the scheduled channel indicates that the system message is updated.

In step 830, it is determined that the corresponding paging indication indicates that there is a paging message in response to detecting that the paging indication for a group to which the UE belongs carried in the DCI of the scheduled channel indicates that there is a paging message.

It can be seen from the above embodiments that the paging indication is read directly from the DCI in the scheduled channel, thereby improving the efficiency of the paging indication.

Corresponding to the above-mentioned embodiments of the method for paging indication, the present disclosure also provides embodiments of devices for implementing paging indication.

Figure 9:
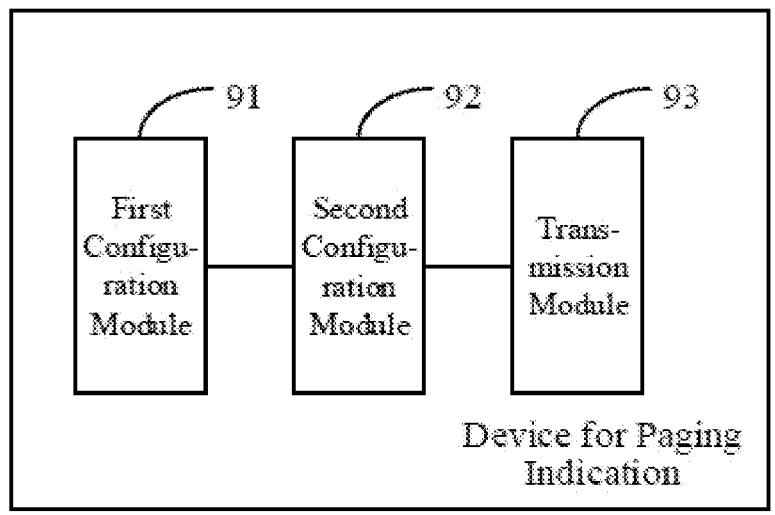
FIG. 9 is a block diagram showing a device for paging indication according to some embodiments.

FIG. 9 is a block diagram showing a device for paging indication according to some embodiments. The device for paging indication can be employed at a base station and configured for performing the method for the paging indication as shown in FIG. 1. As shown in FIG. 9, the device for paging indication can include:

a first configuration module 91 configured to configure at least one first paging occasions for representing a paging indication;

a second configuration module 92 configured to configure a second paging occasion for representing a paging message; and a transmission module 93 configured to transmit the first paging occasion and the second paging occasion to a terminal UE, so that the UE determines a corresponding paging indication according to the first paging occasion and determines a corresponding paging message according to the second paging occasion.

It can be seen from the above embodiments that the first paging occasion for representing the paging indication and the second paging occasion for representing the paging message are configured and transmitted to UEs, so that the UEs can determine different contents at different paging occasions, thereby improving the efficiency of the paging indication.

In some embodiments, the paging indication is configured for indicating that a system message is updated, or for indicating that there is a paging message.

It can be seen from the above embodiments that the paging indication is only configured for indicating that there is a paging message, but does not include the paging message. In this way, the paging indication does not need to be transmitted in PDSCH, but can only be activated in PDCCH, which can save bandwidth resources.

Figure 10:
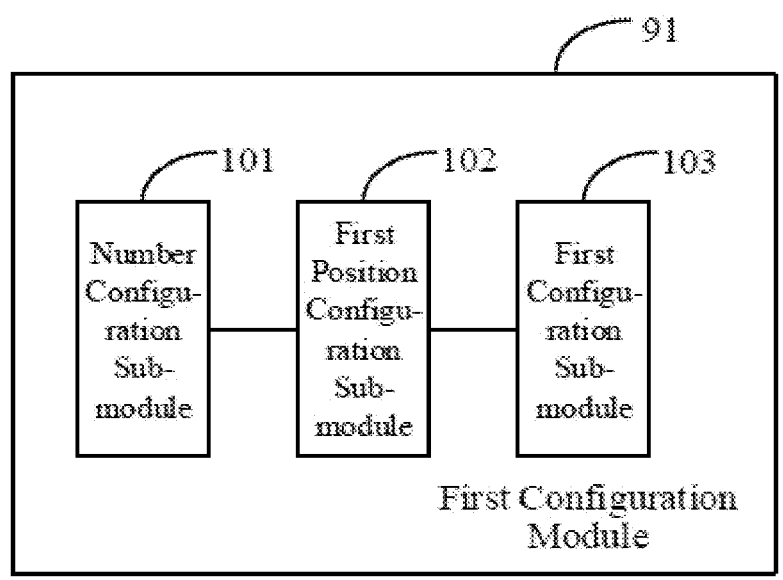
FIG. 10 is a block diagram showing another device for paging indication according to some embodiments.

FIG. 10 is a block diagram showing another device for paging indication according to some embodiments. The device for paging indication can be employed at a base station, and is on the basis of the device shown in FIG. 9. As shown in FIG. 10, the first configuration module 91 can include:

a number configuration sub-module 101 configured to determine the number of the first paging occasion configured in each configuration cycle;

a first position configuration sub-module 102 configured to determine configuration positions corresponding to the respective first paging occasions according to the determined number; and a first configuration sub-module 103 configured to configure respective first paging occasions at respective configuration positions.

It can be seen from the above embodiments that by determining the number of the first paging occasion configured in each configuration cycle, determining the configuration positions corresponding to the respective first paging occasions according to the determined number, and configuring respective first paging occasions at respective determined configuration positions, the position configuration function for the first paging occasion is realized, so that UEs can detect the first paging occasion as soon as possible, thereby improving the efficiency of paging indication.

Figure 11:
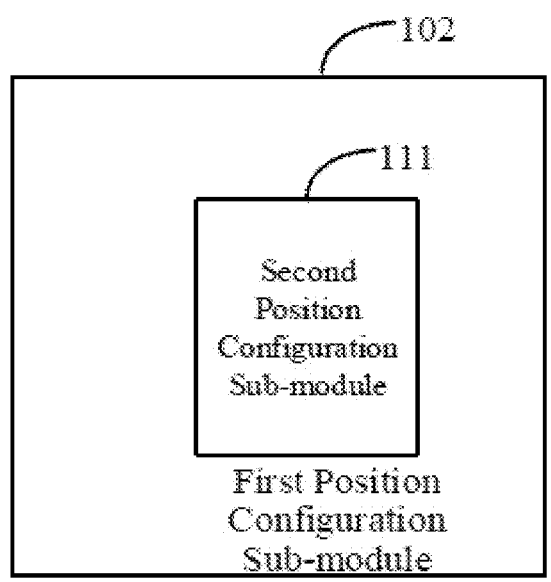
FIG. 11 is a block diagram showing another device for paging indication according to some embodiments.

FIG. 11 is a block diagram showing another device for paging indication according to some embodiments. The device for paging indication can be employed at a base station, and is on the basis of the device shown in FIG. 10. As shown in FIG. 11, the first position configuration sub-module 102 can include:

a second position configuration sub-module 111 configured to determine a first configuration position corresponding to one of the first paging occasion in an approach of FDM, the first configuration position being the same as a position of a SSB in a time domain.

It can be seen from the above embodiments that when one first paging occasion is needed to be configured, the first configuration position corresponding to the first paging occasion can be determined according to the FDM approach, and the first configuration position is the same as a position of SSB in the time domain, so that the first paging occasion is detected at the same time when SSB is received, thereby saving the energy consumption of the UE.

Figure 12:
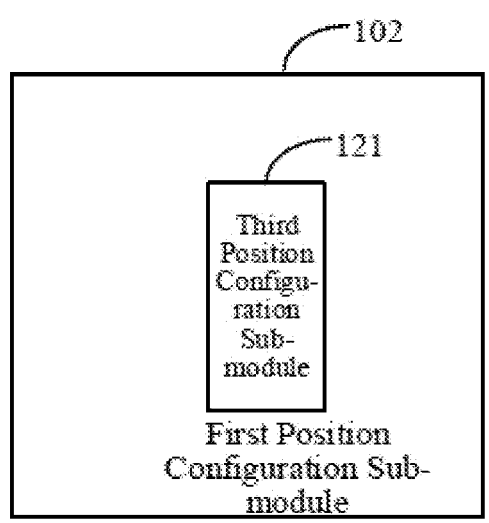
FIG. 12 is a block diagram showing another device for paging indication according to some embodiments.

FIG. 12 is a block diagram showing another device for paging indication according to some embodiments. The device for paging indication can be employed at a base station, and is on the basis of the device shown in FIG. 10. As shown in FIG. 12, the first position configuration sub-module 102 can include:

a third position configuration sub-module 121 configured to determine second configuration positions corresponding to the respective first paging occasions in an approach of the combination of FDM and TDM, wherein one of the second configuration positions is the same as a position of SSB in a time domain, and the others of the second configuration positions are adjacent to the SSB in the time domain.

It can be seen from the above embodiments that when more than one first paging occasions need to be configured, the approach of the combination of FDM and TDM can be used. One of the second configuration positions is the same as a position of an SSB in the time domain, and the others of the second configuration positions are adjacent to the SSB in the time domain. In this way, UEs can detect the respective first paging occasions as soon as possible while receiving SSB, thereby saving the energy consumption of UEs.

Figure 13:
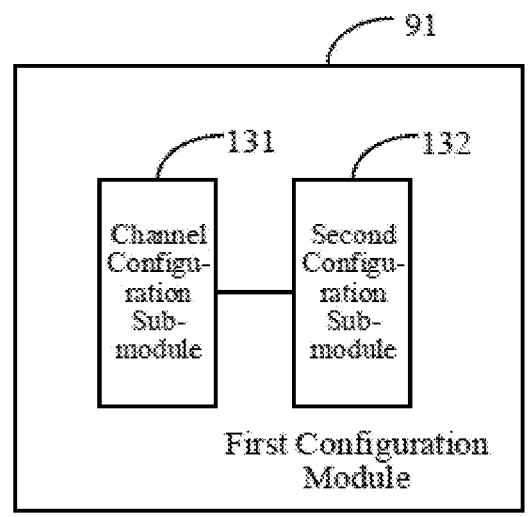
FIG. 13 is a block diagram showing another device for paging indication according to some embodiments.

FIG. 13 is a block diagram showing another device for paging indication according to some embodiments. The device for paging indication can be employed at a base station, and is on the basis of the device shown in FIG. 9. As shown in FIG. 13, the first configuration module 91 can include:

a channel configuration sub-module 131 configured to determine a configuration channel corresponding to the first paging occasion; and a second configuration sub-module 132 configured to configure the first paging occasion according to the configuration channel.

It can be seen from the above embodiments that by determining the configuration channel corresponding to the first paging occasion and configuring the corresponding first paging occasions according to the determined configuration channel, the channel configuration function of the first paging occasion is realized, so that UEs can detect the paging indication corresponding to the first paging occasion as soon as possible, thereby improving the efficiency of the paging indication.

Figure 14:
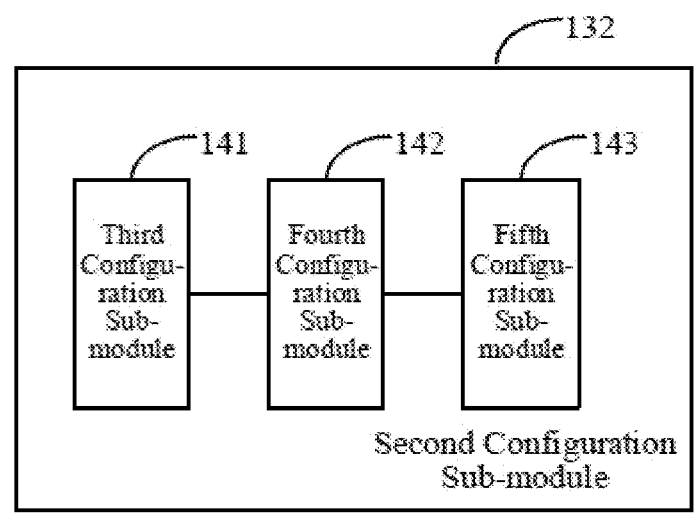
FIG. 14 is a block diagram showing another device for paging indication according to some embodiments.

In some embodiments, the configuration channel is an un-scheduled channel, and the un-scheduled channel is in a form of a bitmap. FIG. 14 is a block diagram showing another device for paging indication according to some embodiments. The device for paging indication can be employed at a base station, and is on the basis of the device shown in FIG. 13. As shown in FIG. 14, the second configuration sub-module 132 can include:

a third configuration sub-module 141 configured to set all bits in the bitmap to 1 if the paging indication indicates that the system message is updated;

a fourth configuration sub-module 142 configured to set the bits corresponding to one or more groups of UEs in the bitmap to 1 if the paging indication indicates that there are paging messages for the one or more groups of UEs; and a fifth configuration sub-module 143 configured to set the bits corresponding to one or more groups of UEs in the bitmap to 0 if the paging indication indicates that there is no paging message for the one or more groups of UEs.

It can be seen from the above embodiments that the unscheduled channel is configured as the configuration channel of the first paging occasion, and the bits in the bitmap are configured to represent the paging indication, so that UEs can quickly identify the paging indication, thereby improving the efficiency of the paging indication.

Figure 15:
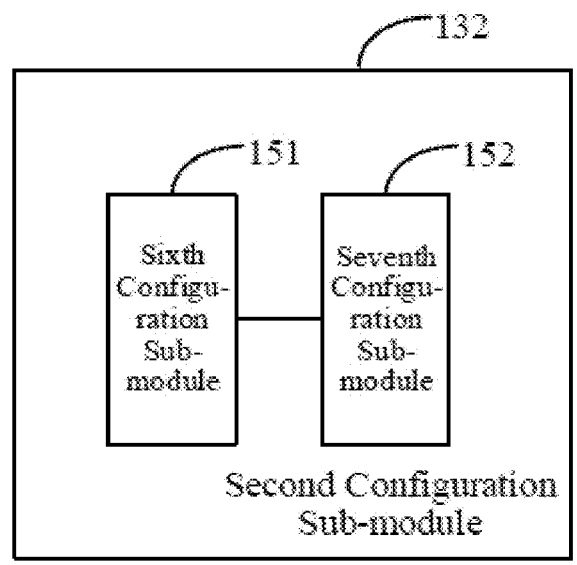
FIG. 15 is a block diagram showing another device for paging indication according to some embodiments.

In some embodiments, the configuration channel is a scheduled channel, and a DCI in the scheduled channel is configured for carrying the paging indication. FIG. 15 is a block diagram showing another device for paging indication according to some embodiments. The device for paging indication can be employed at a base station, and is on the basis of the device shown in FIG. 13. As shown in FIG. 15, the second configuration sub-module 132 can include:

a sixth configuration sub-module 151 configured to add a paging indication indicating that the system message is updated to the DCI if the paging indication indicates that the system message is updated; and a seventh configuration sub-module 152 configured to add a paging indication indicating that there is a paging message for one or more groups of UEs to the DCI if the paging indication indicates that there is a paging message for the one or more groups of UEs.

It can be seen from the above embodiments that the scheduled channel is configured as the configuration channel of the first paging occasion, and the DCI in the scheduled channel carries the paging indication, so that UEs can read the paging indication directly from the DCI, thereby improving the efficiency of the paging indication.

Figure 16:
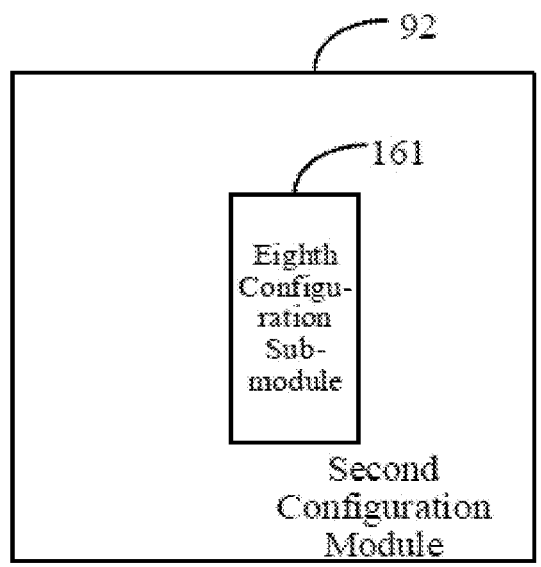
FIG. 16 is a block diagram showing another device for paging indication according to some embodiments.

FIG. 16 is a block diagram showing another device for paging indication according to some embodiments. The device for paging indication can be employed at a base station, and is on the basis of the device shown in FIG. 9. As shown in FIG. 16, the second configuration module 92 can include:

an eighth configuration sub-module 161 configured to configure one second paging occasion in each configuration cycle.

It can be seen from the above embodiments that one second paging occasion is configured in each configuration cycle, which not only ensures that UEs can detect the second paging occasion, but also saves bandwidth resources.

Figure 17:
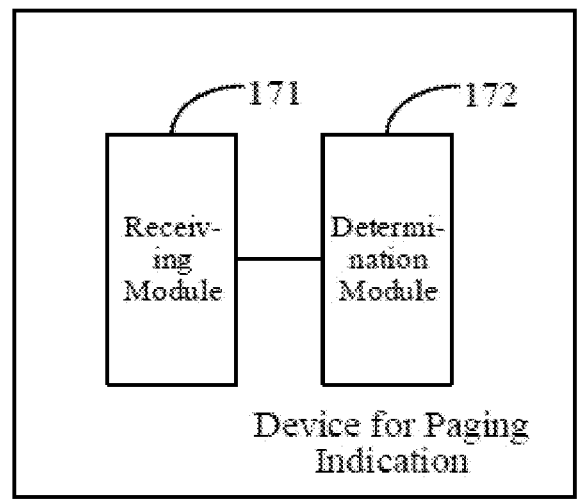
FIG. 17 is a block diagram showing a device for paging indication according to some embodiments.

FIG. 17 is a block diagram showing a device for paging indication according to some embodiments. The device for paging indication can be employed at a UE, which can be any smart terminal supporting Wi-Fi function, such as a mobile phone, a tablet, a PDA (personal digital assistant), etc. As shown in FIG. 17, the device for paging indication can include:

a receiving module 171 configured to receive at least one first paging occasion and a second paging occasion transmitted by a base station, the first paging occasion representing a paging indication, and the second paging occasion representing a paging message; and a determination module 172 configured to determine a corresponding paging indication according to the first paging occasion and determine a corresponding paging message according to the second paging occasion.

It can be seen from the above embodiments that by receiving the first paging occasion and the second paging occasion, determining the corresponding paging indication according to the first paging occasion, and determining the corresponding paging message according to the second paging occasion, UEs can determine different contents at different paging occasions, thereby improving the efficiency of paging indication.

Figure 18:
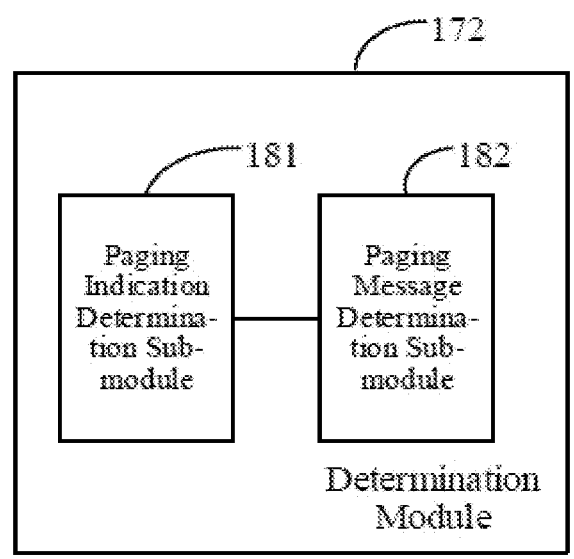
FIG. 18 is a block diagram showing another device for paging indication according to some embodiments.

FIG. 18 is a block diagram showing another device for paging indication according to some embodiments. The device for paging indication can be employed at a UE, and is on the basis of the device shown in FIG. 17. As shown in FIG. 18, the determination module 172 can include:

a paging indication determination sub-module 181 configured to determine the corresponding paging indication according to the first paging occasion; and a paging message determination sub-module 182 configured to determine the corresponding paging message according to the second paging occasion if the paging indication indicates that there is a paging message.

It can be seen from the above embodiment that by determining the corresponding paging indication according to the first paging occasion, the corresponding paging message is determined according to the second paging occasion only when the determined paging indication indicates that there is a paging message, thereby saving the energy consumption of the terminals and improving the efficiency of the paging indication.

Figure 19:
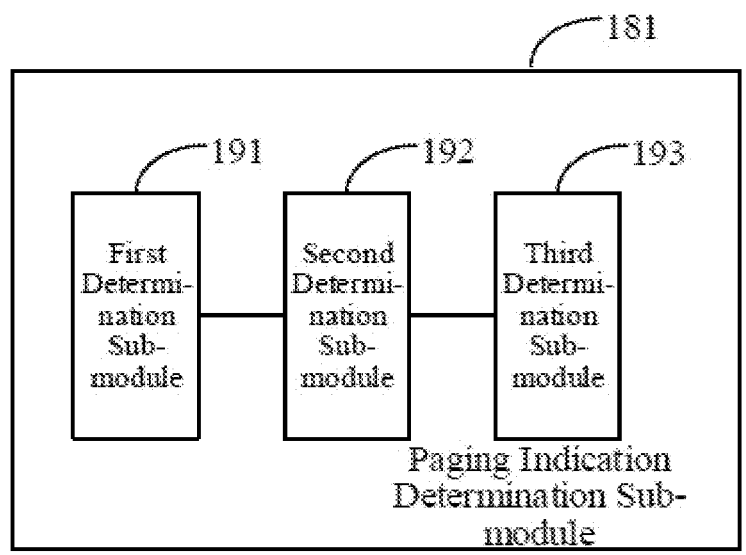
FIG. 19 is a block diagram showing another device for paging indication according to some embodiments.

FIG. 19 is a block diagram showing another device for paging indication according to some embodiments. The device for paging indication can be employed at a UE, and is on the basis of the device shown in FIG. 18. The configuration channel corresponding to the first paging occasion is an unscheduled channel, and the unscheduled channel is in a form of a bitmap. As shown in FIG. 19, the paging indication determination sub-module 181 can include:

a first determination sub-module 191 configured to determine that the corresponding paging indication indicates that the system message is updated in response to detecting that all bits in the bitmap are 1, and read the updated system information;

a second determination sub-module 192 configured to determine that the corresponding paging indication indicates that there is no paging message and continue sleeping in response to detecting that not all of the bits in the bitmap are 1 and the bit indicating for a group to which the UE belongs is 0; and a third determination sub-module 193 configured to determine that the corresponding paging indication indicates that there is a paging message in response to detecting that not all of the bits in the bitmap are 1 and the bit indicating for a group to which the UE belongs is 1.

It can be seen from the above embodiments that the unscheduled channel is configured as the configuration channel of the first paging occasion, and the bits in the bitmap are configured to represent the paging indication, so that UEs can quickly identify the paging indication, thereby improving the efficiency of the paging indication.

Figure 20:
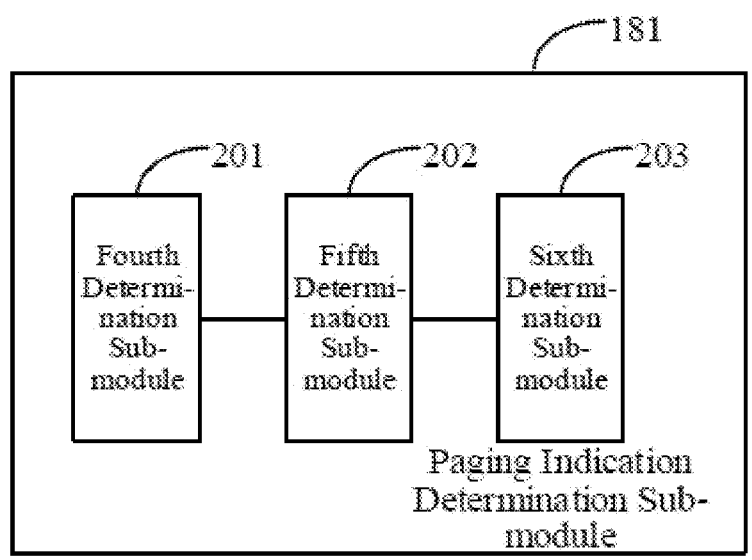
FIG. 20 is a block diagram showing another device for paging indication according to some embodiments.

FIG. 20 is a block diagram showing another device for paging indication according to some embodiments. The device for paging indication can be employed at a UE, and is on the basis of the device shown in FIG. 19. The configuration channel corresponding to the first paging occasion is a scheduled channel, and a Downlink Control Information (DCI) in the scheduled channel is configured for carrying the paging indication. As shown in FIG. 20, the paging indication determination sub-module 181 can include:

a fourth determination sub-module 201 configured to determine that the corresponding paging indication indicates that there is no paging message and continue sleeping in response to detecting that there is no paging indication for a group to which the UE belongs in a DCI of the scheduled channel;

a fifth determination sub-module 202 configured to determine that the corresponding paging indication indicates that there is a paging message in response to detecting that the paging indication carried in the DCI of the scheduled channel indicates that the system message is updated, and read the updated system information; and a sixth determination sub-module 203 configured to determine that the corresponding paging indication indicates that there is a paging message in response to detecting that the paging indication for a group to which the UE belongs carried in the DCI of the scheduled channel indicates that there is a paging message.

It can be seen from the above embodiments that the scheduled channel is configured as the configuration channel of the first paging occasion, and the DCI in the scheduled channel carries the paging indication, so that UEs can read the paging indication directly from the DCI, thereby improving the efficiency of the paging indication.

For the embodiments of the devices, since they basically correspond to the embodiments of the methods, please refer to partial description of the embodiments of the methods for relevant points. The embodiments of the devices described above are only exemplary, in which the units described above as separate components may be or may not be physically separated, and the components displayed as units may be or may not be physical units, that is, they can be located in one place, or they can be distributed to multiple network units. Some or all of the modules can be selected to achieve the purpose of the technical solutions of the present disclosure according to the actual requirements. Those skilled in the art can understand and implement the solutions without paying creative labor.

Correspondingly, the present disclosure also provides a non-transitory computer-readable storage medium on which a computer program is stored for performing any of the methods for paging indication illustrated in FIGS. 1-4.

Correspondingly, the present disclosure also provides a non-temporary computer-readable storage medium on which a computer program is stored for performing any of the methods for paging indication illustrated in FIGS. 5-8.

Correspondingly, the present disclosure also provides a device for paging indication, which is applied to a base station and includes:
  a processor; and
  a memory for storing instructions executable by the processor,
  wherein the processor is configured to:
  configure at least one first paging occasions representing a paging indication;
  configure a second paging occasion representing a paging message; and
  transmit the first paging occasion and the second paging occasion to a terminal UE, so that the UE determines a corresponding paging indication according to the first paging occasion and determine a corresponding paging message according to the second paging occasion.

Figure 21:
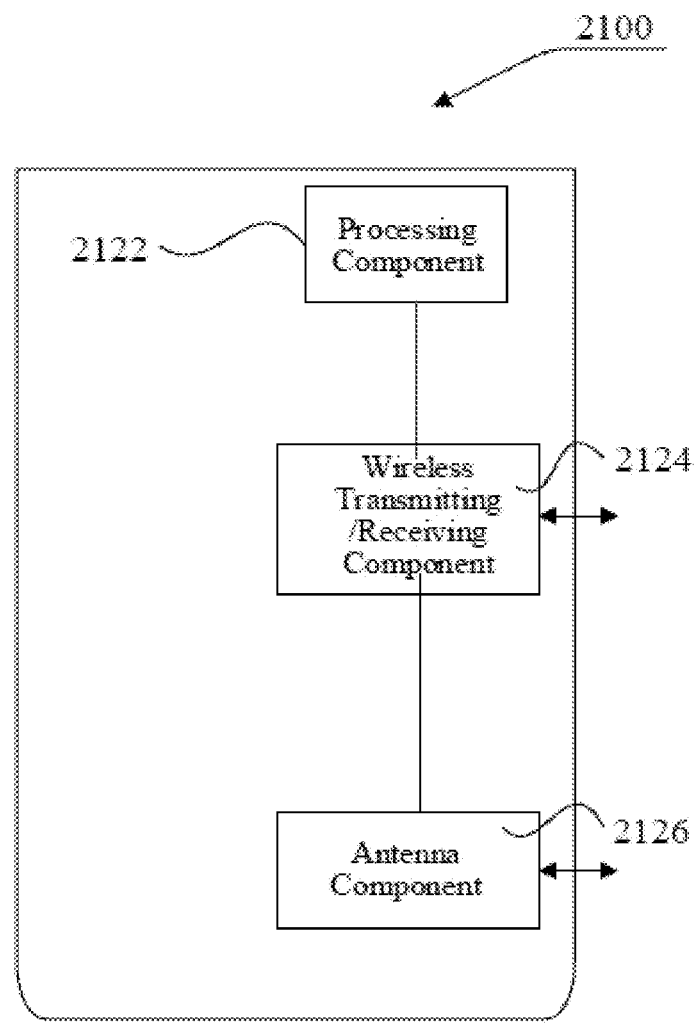
FIG. 21 is a structural schematic diagram illustrating a device for paging indication according to some embodiments.

FIG. 21 is a structural block diagram of a device for paging indicating according to some embodiments. Device 2100 may be provided as a base station. Referring to FIG. 21, device 2100 includes a processing component 2122, a wireless transmitting/receiving component 2124, an antenna component 2126, and a signal processing part specific to the wireless interface, and the processing component 2122 may further include one or more processors.

One of the processors in the processing component 2122 can be configured to perform any of the methods for paging indication described above.

Correspondingly, the present disclosure also provides a device for paging indication, which is applied to a terminal UE and includes:
  a processor; and
  a memory for storing instructions executable by the processor,
  wherein the processor is configured to:
  receive at least one first paging occasion and a second paging occasion transmitted by a base station, the first paging occasion representing a paging indication, and the second paging occasion representing a paging message; and
  determine a corresponding paging indication according to the first paging occasion and determine a corresponding paging message according to the second paging occasion.

Figure 22:
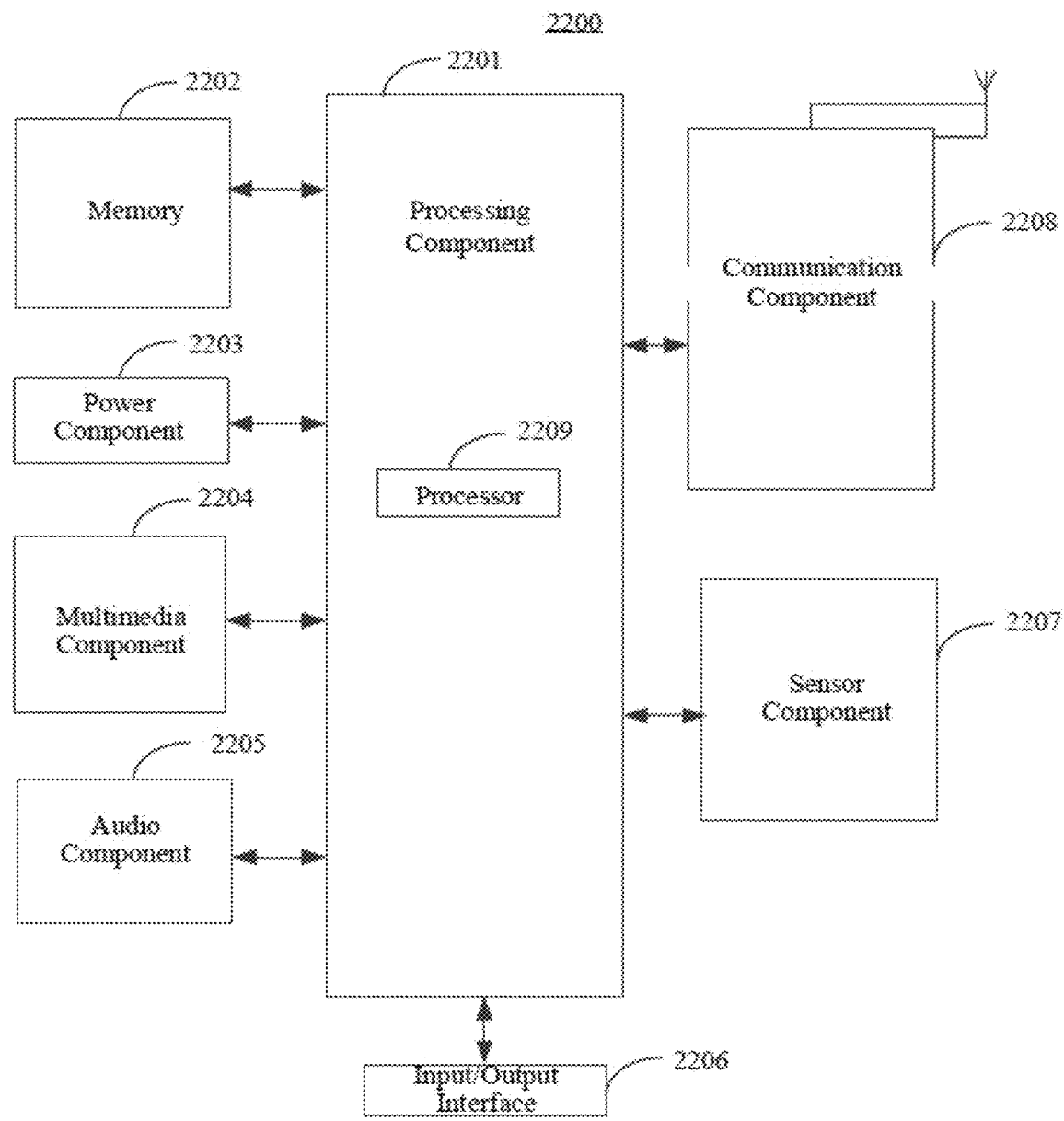
FIG. 22 is a structural schematic diagram illustrating a device for paging indication according to some embodiments.

FIG. 22 is a structural block diagram of a device for paging indication according to some embodiments. As shown in FIG. 22, the device 2200 for paging indication according to some embodiments may be a computer, a mobile phone, a digital broadcast terminal, a messaging device, a game console, a tablet, a medical device, exercise equipment, a personal digital assistant or other terminals.

Referring to FIG. 22, the device 2200 may include one or more of the following components: a processing component 2201, a memory 2202, a power component 2203, a multimedia component 2204, an audio component 2205, an input/output (I/O) interface 2206, a sensor component 2207, and a communication component 2208.

The processing component 2201 typically controls overall operations of the device 2200, such as the operations associated with display, telephone calls, data communications, camera operations, and recording operations. The processing component 2201 may include one or more processors 2209 to execute instructions to perform all or part of the steps in the above described methods. Moreover, the processing component 2201 may include one or more modules which facilitate the interaction between the processing component 2201 and other components. For instance, the processing component 2201 may include a multimedia module to facilitate the interaction between the multimedia component 2204 and the processing component 2201.

The memory 2202 is configured to store various types of data to support the operation of the device 2200. Examples of such data include instructions for any applications or methods operated on the device 2200, contact data, phonebook data, messages, pictures, video, etc. The memory 2202 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2203 provides power to various components of the device 2200. The power component 2203 may include a power management system, one or more power sources, and any other components associated with the generation, management, and distribution of power in the device 2200.

The multimedia component 2204 includes a screen providing an output interface between the device 2200 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2204 includes a front camera and/or a rear camera. The front camera and the rear camera may receive an external multimedia datum while the device 2200 is in an operation mode, such as a photographing mode or a video mode. Each of the front camera and the rear camera may be a fixed optical lens system or have focus and optical zoom capability.

The audio component 2205 is configured to output and/or input audio signals. For example, the audio component 2205 includes a microphone ("MIC") configured to receive an external audio signal when the device 2200 is in an operation mode, such as a call mode, a recording mode, and a voice recognition mode. The received audio signal may be further stored in the memory 2202 or transmitted via the communication component 2208. In some embodiments, the audio component 2205 further includes a speaker to output audio signals.

The I/O interface 2206 provides an interface between the processing component 2201 and peripheral interface modules, such as a keyboard, a click wheel, buttons, and the like. The buttons may include, but are not limited to, a home button, a volume button, a starting button, and a locking button.

The sensor component 2207 includes one or more sensors to provide status assessments of various aspects of the device 2200. For instance, the sensor component 2207 may detect an open/closed status of the device 2200, relative positioning of components, e.g., the display and the keypad, of the device 2200, a change in position of the device 2200 or a component of the device 2200, a presence or absence of user contact with the device 2200, an orientation or an acceleration/deceleration of the device 2200, and a change in temperature of the device 2200. The sensor component 2207 may include a proximity sensor configured to detect the presence of nearby objects without any physical contact. The sensor component 2207 may also include a light sensor, such as a CMOS or CCD image sensor, for use in imaging applications. In some embodiments, the sensor component 2207 may also include an accelerometer sensor, a gyroscope sensor, a magnetic sensor, a pressure sensor, or a temperature sensor.

The communication component 2208 is configured to facilitate communication, wired or wirelessly, between the device 2200 and other devices. The device 2200 can access a wireless network based on a communication standard, such as Wi-Fi, 2G, 3G, 4G or 5G, or a combination thereof. In one exemplary embodiment, the communication component 2208 receives a broadcast signal or broadcast associated information from an external broadcast management system via a broadcast channel. In one exemplary embodiment, the communication component 2208 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2202, executable by the processor 2209 in the device 2200, for performing the above-described methods. For example, the non-transitory computer-readable storage medium may be a ROM, a RAM, a CD-ROM, a magnetic tape, a floppy disc, an optical data storage device, and the like.

The instructions stored in the storage medium, when executed by the processor, can cause the device 2200 to perform any of the methods for paging indication as described above.

Various embodiments of the present disclosure also provide a method and a device for paging indication.

In an aspect, a method for paging indication is provided for a base station, the method including:

configuring at least one first paging occasion, the first paging occasion representing a paging indication;

configuring a second paging occasion, the second paging occasion representing a paging message; and transmitting the first paging occasion and the second paging occasion to a terminal UE so that the UE determines a corresponding paging indication according to the first paging occasion and determines a corresponding paging message according to the second paging occasion.

In some embodiments, the paging indication is configured for indicating that a system message is updated, or for indicating that there is a paging message.

In some embodiments, the configuring the first paging occasion includes:

determining the number of the first paging occasion configured in each configuration cycle;

determining configuration positions corresponding to the respective first paging occasions according to the determined number; and configuring respective first paging occasions at the configuration positions.

In some embodiments, the determined number is one, and the determining the configuration positions corresponding to the respective first paging occasions according to the determined number includes:

determining a first configuration position corresponding to one of the first paging occasion in an approach of Frequency Division Multiplexing (FDM), wherein the first configuration position is the same as a position of a Synchronous Signal Block (SSB) in a time domain.

In some embodiments, the determined number is more than one, and the determining the configuration positions corresponding to the respective first paging occasions according to the determined number includes:

determining second configuration positions corresponding to the respective first paging occasions in an approach of the combination of FDM and Time Division Multiplexing (TDM), wherein one of the second configuration positions is the same as a position of a SSB in a time domain, and the others of the second configuration positions are adjacent to the SSB in the time domain.

In some embodiments, the configuring the first paging occasion includes:

determining a configuration channel corresponding to the first paging occasion; and configuring the first paging occasion according to the configuration channel.

In some embodiments, the configuration channel is an un-scheduled channel, and the un-scheduled channel is in a form of a bitmap, wherein the configuring the first paging occasions according to the configuration channel includes:

setting all bits in the bitmap to 1 if the paging indication indicates that the system message is updated;

setting the bits corresponding to one or more groups of UEs in the bitmap to 1 if the paging indication indicates that there is a paging message for the one or more groups of UEs; and setting the bits corresponding to one or more groups of UEs in the bitmap to 0 if the paging indication indicates that there is no paging message for the one or more groups of UEs.

In some embodiments, the configuration channel is a scheduled channel, and a Downlink Control Information (DCI) in the scheduled channel carries the paging indication.

The configuring the first paging occasions according to the configuration channel includes:

adding a paging indication indicating that the system message is updated to the DCI if the paging indication indicates that the system message is updated; and adding a paging indication indicating that there is a paging message for one or more groups of UEs to the DCI if the paging indication indicates that there is a paging message for the one or more groups of UEs.

In some embodiments, the configuring the second paging occasion includes:

configuring one second paging occasion in each configuration cycle.

In another aspect, a method for paging indication is provided for a terminal UE, the method including:

receiving at least one first paging occasion and a second paging occasion transmitted by a base station, the first paging occasion representing a paging indication, and the second paging occasion representing a paging message; and determining a corresponding paging indication according to the first paging occasion and determining a corresponding paging message according to the second paging occasion.

In some embodiments, the determining the corresponding paging indication according to the first paging occasion and the determining the corresponding paging message according to the second paging occasion includes:

determining the corresponding paging indication according to the first paging occasion; and determining the corresponding paging message according to the second paging occasion if the paging indication indicates that there is a paging message.

In some embodiments, a configuration channel corresponding to the first paging occasion is an unscheduled channel, and the unscheduled channel is in a form of a bitmap, wherein the determining the corresponding paging indication according to the first paging occasion includes:

determining that the corresponding paging indication indicates that the system message is updated and reading the updated system information in response to detecting that all bits in the bitmap are 1;

determining that the corresponding paging indication indicates that there is no paging message and continuing sleeping in response to detecting that not all of the bits in the bitmap are 1 and the bit indicating for a group to which the UE belongs is 0; and determining that the corresponding paging indication indicates that there is a paging message in response to detecting that not all of the bits in the bitmap are 1 and the bit indicating for a group to which the UE belongs is 1.

In some embodiments, a configuration channel corresponding to the first paging occasion is a scheduled channel, and a DCI in the scheduled channel is configured for carrying the paging indication, wherein the determining the corresponding paging indication according to the first paging occasion includes:

determining that the corresponding paging indication indicates that there is no paging message and continuing sleeping in response to detecting that there is no paging indication for a group to which the UE belongs in the DCI of the scheduled channel;

determining that the corresponding paging indication indicates that the system message is updated and reading the updated system information in response to detecting that the paging indication carried in the DCI of the scheduled channel indicates that the system message is updated; and determining that the corresponding paging indication indicates that there is a paging message in response to detecting that the paging indication for a group to which the UE belongs carried in the DCI of the scheduled channel indicates that there is a paging message.

In another aspect, a device for paging indication is provided for a base station, the device including:

a first configuration module configured to configure at least one first paging occasion, the first paging occasion representing a paging indication;

a second configuration module configured to configure a second paging occasion, the second paging occasion representing a paging message; and a transmission module configured to transmit the first paging occasion and the second paging occasion to a terminal UE, so that the UE determines a corresponding paging indication according to the first paging occasion and determines a corresponding paging message according to the second paging occasion.

In some embodiments, the paging indication is configured for indicating that a system message is updated, or for indicating that there is a paging message.

In some embodiments, the first configuration module includes:

a number configuration sub-module configured to determine the number of the first paging occasion configured in each configuration cycle;

a first position configuration sub-module configured to determine configuration positions corresponding to the respective first paging occasions according to the determined number; and a first configuration sub-module configured to configure respective first paging occasions at respective configuration positions.

In some embodiments, the determined number is one and the first position configuration sub-module includes:

a second position configuration sub-module configured to determine a first configuration position corresponding to one of the first paging occasion in an approach of Frequency Division Multiplexing (FDM), wherein the first configuration position is the same as a position of a Synchronous Signal Block (SSB) in a time domain.

In some embodiments, the determined number is more than one, and the first position configuration sub-module includes:

a third position configuration sub-module configured to determine second configuration positions corresponding to the respective first paging occasions in an approach of the combination of FDM and Time Division Multiplexing (TDM), wherein one of the second configuration positions is the same as a position of a SSB in a time domain, and the others of the second configuration positions are adjacent to the SSB in the time domain.

In some embodiments, the first configuration module includes:

a channel configuration sub-module configured to determine a configuration channel corresponding to the first paging occasion; and a second configuration sub-module configured to configure the first paging occasion according to the configuration channel.

In some embodiments, the configuration channel is an un-scheduled channel, and the un-scheduled channel is in a form of a bitmap, and the second configuration sub-module includes:

a third configuration sub-module configured to set all bits in the bitmap to 1 if the paging indication indicates that the system message is updated;

a fourth configuration sub-module configured to set the bits corresponding to one or more groups of UEs in the bitmap to 1 if the paging indication indicates that there is a paging message for the one or more groups of UEs; and a fifth configuration sub-module configured to set the bits corresponding to one or more groups of UEs in the bitmap to 0 if the paging indication indicates that there is no paging message for the one or more groups of UEs.

In some embodiments, the configuration channel is a scheduled channel, and a Downlink Control Information (DCI) in the scheduled channel is configured for carrying the paging indication, and the second configuration sub-module includes:

a sixth configuration sub-module configured to add a paging indication indicating that the system message is updated to the DCI if the paging indication indicates that the system message is updated; and a seventh configuration sub-module configured to add a paging indication indicating that there is a paging message for one or more groups of UEs to the DCI if the paging indication indicates that there is a paging message for the one or more groups of UEs.

In some embodiments, the second configuration module includes:

an eighth configuration sub-module configured to configure one second paging occasion in each configuration cycle.

In another aspect, a device for paging indication is provided for a terminal UE, the device including:

a receiving module configured to receive at least one first paging occasion and a second paging occasion transmitted by a base station, the first paging occasion representing a paging indication, and the second paging occasion representing a paging message; and a determination module configured to determine a corresponding paging indication according to the first paging occasion and determine a corresponding paging message according to the second paging occasion.

In some embodiments, the determination module includes:

a paging indication determination sub-module configured to determine the corresponding paging indication according to the first paging occasion; and a paging message determination sub-module configured to determine the corresponding paging message according to the second paging occasion if the paging indication indicates that there is a paging message.

In some embodiments, a configuration channel corresponding to the first paging occasion is an unscheduled channel, and the unscheduled channel is in a form of a bitmap, wherein the paging indication determination sub-module includes:

a first determination sub-module configured to determine that the corresponding paging indication indicates that the system message is updated and read the updated system information in response to detecting that all bits in the bitmap are 1;

a second determination sub-module configured to determine that the corresponding paging indication indicates that there is no paging message and continue sleeping in response to detecting that not all of the bits in the bitmap are 1 and the bit indicating for a group to which the UE belongs is 0; and a third determination sub-module configured to determine that the corresponding paging indication indicates that there is a paging message in response to detecting that not all of the bits in the bitmap are 1 and the bit indicating for a group to which the UE belongs is 1.

In some embodiments, a configuration channel corresponding to the first paging occasion is a scheduled channel, and a Downlink Control Information (DCI) in the scheduled channel is configured for carrying the paging indication, wherein the paging indication determination sub-module includes:

a fourth determination sub-module configured to determine that the corresponding paging indication indicates that there is no paging message and continue sleeping in response to detecting that there is no paging indication for a group to which the UE belongs in the DCI of the scheduled channel;

a fifth determination sub-module configured to determine that the corresponding paging indication indicates that there is a paging message in response to detecting that the paging indication carried in the DCI of the scheduled channel indicates that the system message is updated, and read the updated system information; and a sixth determination sub-module configured to determine that the corresponding paging indication indicates that there is a paging message in response to detecting that the paging indication for a group to which the UE belongs carried in the DCI of the scheduled channel indicates that there is a paging message.

In another aspect, there is provided a non-transitory computer-readable storage medium having stored therein computer program for performing the method for paging indication of the first aspect.

In another aspect, there is provided a non-transitory computer-readable storage medium having stored therein computer program for performing the method for paging indication of the second aspect.

In another aspect, there is provided a device for paging indication, applied to a base station, the device including:

a processor; and a memory for storing instructions executable by the processor, wherein the processor is configured to:

configure at least one first paging occasion representing a paging indication;

configure a second paging occasion representing a paging message; and transmit the first paging occasion and the second paging occasion to a terminal UE, so that the UE determines a corresponding paging indication according to the first paging occasion and determines a corresponding paging message according to the second paging occasion.

In another aspect, there is provided a device for paging indication, applied to a terminal UE, the device including:

a processor; and memory for storing instructions executable by the processor, wherein the processor is configured to:

receive at least one first paging occasion and a second paging occasion transmitted by a base station, wherein the first paging occasion is configured for representing a paging indication, and the second paging occasion is configured for representing a paging message; and determine a corresponding paging indication according to the first paging occasion and determine a corresponding paging message according to the second paging occasion.

Various embodiments of the present disclosure can have one or more of the following advantages.

In some embodiments of the present disclosure, the base station can configure at least one first paging occasion representing the paging indication and a second paging occasion representing the paging message and transmit the first and second paging occasions to the UE, so that the UE can determine different contents at different paging occasions, thereby improving the efficiency of the paging indication.

In some embodiments of the present disclosure, the paging indication is only configured for indicating that there is a paging message, but does not include the paging message. In this way, it's unnecessary for the paging indication to be transmitted in PDSCH. Instead, the paging indication can be only activated in PDCCH, thereby bandwidth resources can be saved.

In some embodiments of the present disclosure, the base station can determine the number of the first paging occasions configured in each configuration cycle, determine the configuration positions corresponding to the respective first paging occasions according to the determined number, and configure respective first paging occasions at the respective configuration positions. Thereby, the position configuration function of the first paging occasion is achieved, and UEs can detect the paging indication corresponding to the first paging occasion as soon as possible. The efficiency of the paging indication is thus improved.

In some embodiments of the present disclosure, when determining to configure one first paging occasion, the base station can configure the first configuration position corresponding to the one first paging occasion in an approach of FDM, and the first configuration position is the same as a position of a SSB in the time domain, so that the UE will detect the first paging occasion at the same time when receiving the SSB, thereby saving energy consumption of the UEs.

In some embodiments of the present disclosure, when determining to configure more than one first paging occasions, the base station can adopt the combination of the approaches of FDM and TDM. One of the second configuration positions is the same as a position of SSB in the time domain, and the others of the second configuration positions are adjacent to SSB in the time domain. In this way, UEs can detect the respective first paging occasions as soon as possible while receiving SSB, thereby saving the energy consumption of UEs.

In some embodiments of the present disclosure, the base station can determine the configuration channel corresponding to the first paging occasions and configure the corresponding first paging occasions according to the determined configuration channel. The channel configuration function of the first paging occasion can be achieved, so that UEs can detect the paging indication corresponding to the first paging occasion as soon as possible, thereby improving the efficiency of the paging indication.

In some embodiments of the present disclosure, the base station can use the unscheduled channel as the configuration channel of the first paging occasions, and use the bits in the bitmap to represent the paging indication, so that UEs can quickly identify the paging indication, thereby improving the efficiency of the paging indication.

In some embodiments of the present disclosure, the base station can use the scheduled channel as the configuration channel of the first paging occasions, and the DCI in the scheduled channel carries the paging indication, so that the UE can read the paging indication directly from the DCI, thereby improving the efficiency of the paging indication.

In some embodiments of the present disclosure, the base station configures one second paging occasion in each configuration cycle, which not only ensures that UEs can detect the second paging occasion, but also saves bandwidth resources.

In some embodiments of the present disclosure, the terminal can receive the first paging occasion and the second paging occasion, determine the corresponding paging indication according to the first paging occasion, and determine the corresponding paging message according to the second paging occasion, so that the UE can determine different contents at different paging occasions, thereby improving the efficiency of paging indication.

In some embodiments of the present disclosure, the terminal can determine the corresponding paging indication according to the first paging occasion, and determine the corresponding paging message according to the second paging occasion only when the determined paging indication indicates that there is a paging message. Thereby the energy consumption of the terminals is saved and the efficiency of the paging indication is improved.

In some embodiments of the present disclosure, the terminal can identify the paging indication by the bits in the bitmap of the unscheduled channel, so that the paging indication can be quickly identified, thereby improving the efficiency of the paging indication.

In some embodiments of the present disclosure, the terminal can read the paging indication directly from the DCI in the scheduled channel, thereby improving the efficiency of the paging indication.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Terms used in the present disclosure are only adopted for the purpose of describing specific embodiments but not intended to limit the present disclosure. "A/an," "said" and "the" in a singular form in the present disclosure and the appended claims are also intended to include a plural form, unless other meanings are clearly denoted throughout the present disclosure.

It is to be understood that terms such as "a/an" do not represent a number limit but represent "at least one." Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for paging indication, the method comprising:
configuring at least one first paging occasion for representing a paging indication;
configuring a second paging occasion for representing a paging message; and
transmitting the first paging occasion and the second paging occasion to a terminal User Equipment (UE) such that the UE determines a corresponding paging indication according to the first paging occasion and determines a corresponding paging message according to the second paging occasion;
wherein the configuring the first paging occasion comprises:
determining a configuration channel corresponding to the first paging occasion; and configuring the first paging occasion according to the configuration channel;
wherein
in a case that the configuration channel is an un-scheduled channel, and the un-scheduled channel is in a form of a bitmap,
the configuring the first paging occasion according to the configuration channel comprises:
setting all bits in the bitmap to 1 when the paging indication indicates that the system message is updated;
setting the bits corresponding to one or more groups of UEs in the bitmap to 1 when the paging indication indicates that there is a paging message for the one or more groups of UEs; and
setting the bits corresponding to one or more groups of UEs in the bitmap to 0 when the paging indication indicates that there is no paging message for the one or more groups of UEs; and
in a case that the configuration channel is a scheduled channel, and a Downlink Control Information (DCI) in the scheduled channel carries the paging indication,
the configuring the first paging occasion according to the configuration channel comprises:
adding a paging indication indicating that the system message is updated to the DCI when the paging indication indicates that the system message is updated; and
adding a paging indication indicating that there is a paging message for one or more groups of UEs to the DCI when the paging indication indicates that there is a paging message for the one or more groups of UEs.

2. The method of claim 1, wherein the paging indication is configured for indicating that a system message is updated, or indicating that there is a paging message.

3. The method of claim 1, wherein the configuring the first paging occasion comprises:
determining the number of the first paging occasions configured in each configuration cycle;
determining configuration positions corresponding to the respective first paging occasion according to the determined number; and
configuring the first paging occasions respectively at the configuration positions.

4. The method of claim 3, wherein the determined number is one, and the determining the configuration positions corresponding to the respective first paging occasion according to the determined number comprises:
determining a first configuration position corresponding to one of the first paging occasion in an approach of Frequency Division Multiplexing (FDM), wherein the first configuration position is the same as a position of a Synchronous Signal Block (SSB) in a time domain.

5. The method of claim 3, wherein the number is more than one, and the determining the configuration positions corresponding to the respective first paging occasions according to the determined number comprises:
determining second configuration positions corresponding to the respective first paging occasions in an approach of the combination of FDM and Time Division Multiplexing (TDM), wherein one of the second configuration positions is the same as a position of a SSB in a time domain, and the others of the second configuration positions are adjacent to the SSB in the time domain.

6. The method of claim 1, wherein the configuring the second paging occasion comprises:

configuring one second paging occasion in each configuration cycle.

7. A method for paging indication, the method comprising:
receiving at least one first paging occasion and a second paging occasion transmitted by a base station, the first paging occasion representing a paging indication, and the second paging occasion representing a paging message; and
determining a corresponding paging indication according to the first paging occasion and determining a corresponding paging message according to the second paging occasion;
wherein the determining the corresponding paging indication according to the first paging occasion and the determining the corresponding paging message according to the second paging occasion comprises:
determining the corresponding paging indication according to the first paging occasion; and
determining the corresponding paging message according to the second paging occasion when the determined paging indication indicates that there is a paging message;
wherein
in a case that a configuration channel corresponding to the first paging occasion is an unscheduled channel, and the unscheduled channel is in a form of a bitmap,
the determining the corresponding paging indication according to the first paging occasion comprises:
determining that the corresponding paging indication indicates that the system message is updated and reading the updated system information in response to detecting that all bits in the bitmap are 1;
determining that the corresponding paging indication indicates that there is no paging message and continuing sleeping in response to detecting that not all of the bits in the bitmap are 1 and the bit indicating for a group to which the UE belongs is 0; and
determining that the corresponding paging indication indicates that there is a paging message in response to detecting that not all of the bits in the bitmap are 1 and the bit indicating for a group to which the UE belongs is 1; and
in a case that a configuration channel corresponding to the first paging occasion is a scheduled channel, and a Downlink Control Information (DCI) in the scheduled channel is configured for carrying the paging indication,
the determining the corresponding paging indication according to the first paging occasion comprises:
determining that the corresponding paging indication indicates that there is no paging message and continuing sleeping in response to detecting that there is no paging indication for a group to which the UE belongs in the DCI of the scheduled channel;
determining that the corresponding paging indication indicates that the system message is updated and reading the updated system information in response to detecting that the paging indication carried in the DCI of the scheduled channel indicates that the system message is updated; and
determining that the corresponding paging indication indicates that there is a paging message in response to detecting that the paging indication for a group to which the UE belongs carried in the DCI of the scheduled channel indicates that there is a paging message.

8. A device for paging indication, the device comprising:
a processor; and
memory having instructions stored thereon and executable by the processor,
wherein the processor is configured to:
receive at least one first paging occasion and a second paging occasion transmitted by a base station, the first paging occasion representing a paging indication, and the second paging occasion representing a paging message; and
determine a corresponding paging indication according to the first paging occasion and determine a corresponding paging message according to the second paging occasion;
wherein the processor is further configured to:
determine the corresponding paging indication according to the first paging occasion; and
determine the corresponding paging message according to the second paging occasion when the paging indication indicates that there is a paging message;
wherein
in a case that a configuration channel corresponding to the first paging occasion is an unscheduled channel, and the unscheduled channel is in a form of a bitmap,
the processor is further configured to:
determine that the corresponding paging indication indicates that the system message is updated and read the updated system information in response to detecting that all bits in the bitmap are 1;
determine that the corresponding paging indication indicates that there is no paging message and continue sleeping in response to detecting that not all of the bits in the bitmap are 1 and the bit indicating for a group to which the UE belongs is 0; and
determine that the corresponding paging indication indicates that there is a paging message in response to detecting that not all of the bits in the bitmap are 1 and the bit indicating for a group to which the UE belongs is 1; and
in a case that a configuration channel corresponding to the first paging occasion is a scheduled channel, and a Downlink Control Information (DCI) in the scheduled channel is configured for carrying the paging indication,
the processor is further configured to:
determine that the corresponding paging indication indicates that there is no paging message and continue sleeping in response to detecting that there is no paging indication for a group to which the UE belongs in the DCI of the scheduled channel;
determine that the corresponding paging indication indicates that there is a paging message and read the updated system information in response to detecting that the paging indication carried in the DCI of the scheduled channel indicates that the system message is updated; and
determine that the corresponding paging indication indicates that there is a paging message in response to detecting that the paging indication for a group to which the UE belongs carried in the DCI of the scheduled channel indicates that there is a paging message.

* * * * *

UNITED STATES PATENT AND TRADEMARK OFFICE
CERTIFICATE OF CORRECTION

PATENT NO. : 11,019,598 B1
APPLICATION NO. : 16/786982
DATED : May 25, 2021
INVENTOR(S) : Yang Liu It is certified that error appears in the above-identified patent and that said Letters Patent is hereby corrected as shown below:

On the Title Page

The Related U.S. Application Data should be listed as:
(63) Continuation of application No. PCT/CN2017/097158, filed on Aug. 11, 2017.

Signed and Sealed this
Twenty-eighth Day of March, 2023

Katherine Kelly Vidal
*Director of the United States Patent and Trademark Office*